US008122472B2

(12) United States Patent
Krieger et al.

(10) Patent No.: US 8,122,472 B2
(45) Date of Patent: Feb. 21, 2012

(54) USER INTERFACE PRESENTING ENHANCED VIDEO CONTENT INFORMATION ASSOCIATED WITH VIDEO PROGRAMS

(75) Inventors: Allyson M. Krieger, Redwood City, CA (US); David B. Delp, San Francisco, CA (US); Garth A. Lewis, Sunnyvale, CA (US); Eric Emil Kattwinkel, Oakland, CA (US); Joseph A. Schrader, Los Altos, CA (US); Rowland W. Yerkes, San Ramon, CA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/873,348

(22) Filed: Oct. 16, 2007

(65) Prior Publication Data
US 2008/0276278 A1 Nov. 6, 2008

Related U.S. Application Data

(63) Continuation of application No. 10/071,444, filed on Feb. 8, 2002, now Pat. No. 7,293,275.

(51) Int. Cl.
*G06F 3/00* (2006.01)
*G06F 13/00* (2006.01)
*H04N 5/445* (2006.01)

(52) U.S. Cl. .......................................... 725/53; 725/52
(58) Field of Classification Search .................... 725/45, 725/51–53, 37
See application file for complete search history.

(56) References Cited

U.S. PATENT DOCUMENTS

| | | | |
|---|---|---|---|
| 5,678,012 A | 10/1997 | Kimmich | |
| 5,798,785 A * | 8/1998 | Hendricks et al. | 725/46 |
| 6,002,394 A | 12/1999 | Schein | |
| 6,268,849 B1 * | 7/2001 | Boyer et al. | 725/40 |
| 6,498,895 B2 | 12/2002 | Young | |
| 6,822,661 B2 | 11/2004 | Sai | |
| 6,990,676 B1 | 1/2006 | Proehl | |
| 7,293,275 B1 | 11/2007 | Krieger | |
| 2002/0032905 A1 | 3/2002 | Sherr | |
| 2002/0042920 A1 | 4/2002 | Thomas | |
| 2004/0168186 A1 | 8/2004 | Rector | |
| 2006/0026665 A1 | 2/2006 | Rodriguez | |

OTHER PUBLICATIONS

Greco NPL Reference Greco, Janet; Data Preparation for Interactive Electronic Program Guides; International Broadcasting Convention, Conference Publication No. 428; Sep. 12-16, 1996, pp. 294-297.

(Continued)

*Primary Examiner* — Ngoc Vu
(74) *Attorney, Agent, or Firm* — Workman Nydegger (57) ABSTRACT

Providing interactive access to video programming and video content information in a multimedia system. A processing device of the multimedia system receives video content information associated with video programming that is to be broadcast. The video content information includes at least video identification information and video content information. The display device of the multimedia system presents a first interface image that presents the video content information for one of the video programs of the video programming. In response to viewer input, a second interface image is displayed on the display device presenting video content information for another one of the video programs of the video programming or for more detailed information associated with the video program. In this manner, the viewer can conveniently navigate through the video content information and identify information that is useful in selecting a program to watch.

2 Claims, 8 Drawing Sheets

OTHER PUBLICATIONS

Panter NPL Reference Panter, John V.; Interactive Digital Television A Systems Overview; ICL Systems Journal; vol. 14, Issue 1; Autumn 1999, pp. 1-20. 139 (IDS Filed).

Office Action mailed Oct. 26, 2006 cited in related U.S. Appl. No. 10/071,444.

Office Action mailed May 17, 2007 cited in related U.S. Appl. No. 10/071,444.

Notice of Allowance mailed Aug. 23, 2007 cited in related U.S. Appl. No. 10/071,444.

Issue Notification mailed Oct. 17, 2007 cited in related U.S. Appl. No. 10/071,444.

* cited by examiner

USER INTERFACE PRESENTING ENHANCED VIDEO CONTENT INFORMATION ASSOCIATED WITH VIDEO PROGRAMS

CROSS-REFERENCE TO RELATED APPLICATION

This patent application is a continuation of co-pending, commonly assigned, non-provisional U.S. patent application Ser. No. 10/071,444, entitled "ENHANCED VIDEO CONTENT INFORMATION ASSOCIATED WITH VIDEO PROGRAMS," and filed on Feb. 8, 2002.

BACKGROUND OF THE INVENTION

1. The Field of the Invention

The present invention relates generally to information relating to programming sent via a video format which can be viewed upon a display device. More specifically, the present invention relates to systems and methods for providing interactive access to video programming and enhanced video content information.

2. Background and Related Art

The rapid increase in consumer demand for consumer technology has prompted an exponential growth in the number of available video programs communicated across broadcast networks, satellite, cable, and the Internet. For example, many cable and television services offer dozens if not hundreds of different channels from which the viewers may choose. Video programs containing movies, network television series, sporting event broadcasts, news programs, and a variety of other content are available to viewers on an unprecedented scale. This has resulted in a dramatic increase in the amount and type of information accessible by a viewer. Unfortunately, the increase in the quantity of information, e.g., broadcast programming and services, complicates selection of programs and services. Unless a viewer is able to quickly and easily identify desired programs and services and determine when those programs and services are available, most viewers will not realize the full potential for using and accessing the available wealth of knowledge and entertainment.

As viewers attempt to identify video programming to watch, there are limited resources available to assist identifying those video programs that will be of the most interest. Published television program guides, newspaper program review columns, and Internet websites provide some limited information relating to video programs to be broadcast. However, many of the resources available to viewers are not typically available when they are most useful. This is because such resources are not conveniently accessible when viewers sit down to view or record a broadcast video program. For example, when a viewer sits down to watch television, the viewer is typically not in the frame of mind to turn on the computer, log onto the Internet, and find and browse all the websites needed to determine what television program to watch or to find and search a published television program guide. Instead, the viewer typically wants to relax, using nothing more than the remote control to identify broadcast programs containing desired content such as movies, network television series, sporting event broadcasts, news programs, or other content of interest to the viewer.

Typically, a viewer identifies the availability of broadcast programming by way of an electronic programming guide (EPG), which is also known as an advanced program guide (APG). The EPG provides the viewer with a schedule of broadcast programming and services presented as a time-based grid. Time blocks in the EPG are commonly arranged in columns, while different channels are arranged in rows. Some existing electronic programming guides allow the viewer to view programs which will be shown up to fourteen days in advance.

Although current advances with electronic programming guides provide the viewer with flexibility in viewing broadcast program information from the monitor used to display the broadcast programming, there are still significant problems. The sheer volume of listings in the electronic programming guides makes identifying programs to watch difficult. Moreover, the short descriptions provided by electronic programming guides provide insufficient information to determine the true nature of many listed programs and make decisions between the increased number of choices. Additionally, viewers are limited to browsing programs based on limited criteria such as viewing time or the title of the programs. Another drawback is that the depth of information provided by electronic programming guide often fails to provide an enhanced overall viewing experience within the viewing space.

While Internet websites dedicated to broadcast programming may offer a depth of information greater than that of an electronic program guide, they still have significant drawbacks. Internet websites are typically focused on a narrow range of interests. For example, Internet websites often lack comprehensive listing coverage. Websites typically are dedicated to a narrow subset of the total listings, such as a particular television series, television network, or movie genre. Additionally, the limited nature of the information provided by Internet websites requires that viewers access multiple websites to effectively compare programs offered. Another drawback of Internet websites is that they typically are not conveniently accessible when a viewer sits down to watch television or some other broadcast medium. Even if the viewer can conveniently access the Internet, the time required to browse the vast number of websites to collect the scope and depth of information for comprehensive broadcast listings is prohibitive.

As a result, viewers are often unable to efficiently learn of the programming or services that are currently being broadcast or that will be available in the future. The difficulty of using electronic programming guides, print publications or Internet websites is generally experienced with respect to any type of programming. For example, it is often particularly problematic when the viewer attempts to determine which movies are available, due to a variety of factors, including the large number of movies that are available on any given day and the fact that the decision as to which movie is desired is best made when the viewer can easily learn of the content of a particular movie, the actors, and other information specific to the movie, all of which cannot be quickly and conveniently determined using conventional electronic programming guides.

SUMMARY OF THE INVENTION

The present invention provides interactive access to video programming and associated video content information accessible at the time of viewing/recording. The viewer interface provides access to the video content information before, during, or after the broadcast of the associated video program. This allows viewers to conveniently access video programming related content information when it is most useful, when the viewer is watching television. For example, if a viewer is browsing video programming related to movie programming, the viewer can access video content information including, but not limited to, movie reviews, synopses, cast lists, MPAA ratings, star ratings, critic reviews, related videos, awards listings, quotes, featured articles, celebrity interviews, user ratings and reviews, video trailers, video reviews, behind the scenes video, video celebrity interviews, and related merchandise commerce. While movies are presented as an example of one type of video programming having associated video content information, a variety of types of video programming and appropriately tailored video content information may be provided to the viewer including, but not limited to, network television series, sporting event broadcasts, and news programs.

The video content information is presented on a user interface in an easily navigable fashion. The viewer can browse through and navigate between different pages, or interface images, associated with different video programs by selecting active links in the pages. The video content is aggregated and associated with live video program listings, allowing viewers to access all the video programming-related information from a single source. Thus, while the viewer is watching television, the viewer can investigate information related to the video programs currently in progress, about to be shown, or to be shown in the future. By aggregating the video content with the live video program listings, the viewer can browse a depth of information without needing to access a remote website or to toggle between different websites. For example, the viewer, while viewing a particular video program, can select a link to the program associated interface page. From the interface page, the viewer can access another page relating to an actor, a critic review, another related movie, etc., to be displayed.

According to one aspect of the present invention, the user interface provides filtering functionality allowing viewers to execute searches using multiple simultaneous filtering parameters. For example, a viewer can find movies of a particular genre, with a given actor, directed by a particular director. By making the video content information filterable, the variety and complexity of available searches is greatly enhanced.

The user interface, described above, is accessible by the viewer before, during, or after the broadcast of the associated video program. By providing access to video content information prior to the broadcast of the video program programming, the viewer can access video content information in an effort to determine whether particular video programs are worth being viewed or recorded. For example, if a viewer is interested in viewing a National Football League game on Monday Night Football, the viewer can access information about the teams playing, the teams' rankings, player information, pre-game analysis, or any other information that would be useful in determining whether or not to watch the game.

Providing access during a broadcast provides viewers with an enhanced viewing experience. The viewer can pause the video being shown and browse information related to the video. For example, if a viewer were interested in discovering the name of a particular actor or the location where a particular scene was filmed, such information can be determined by accessing video content information. Other video content related information such as movie reviews, MPAA rating, director information, and behind the scenes video clips can also be browsed by the viewer if the viewer's interest in other aspects of the movie is piqued. The present invention allows the viewer to view the video content information on the same system on which the video program is displayed. The viewer can also locate related programs by browsing the video content information or by utilizing the filtering functionality. In one embodiment, a video pause button automatically records the video program being broadcast, allowing the viewer to return to the same point in the program where the viewer began viewing video content information. Providing access to video content information after a broadcast allows viewers to learn more about programs previously viewed.

In one embodiment of the present invention, the video programs include movies. In this embodiment, the viewer can select movies to watch based on movie content information associated with the movies to be broadcast. The popularity of movies among consumers as well as the vast amount of available movie-related content information make providing video content information associated with movies economically advantageous. Many movies already have trailers, recorded celebrity interviews, rating information, and critic reviews associated with them, and such information is often more readily available to distributors of the video programming than corresponding information for other types of video programming.

Thus, the present invention provides a user interface that enables viewers to conveniently access large and varied amounts of detailed information relating to movies or other video programming. The navigable nature of the user interface allows viewers to easily compare movies or find related movies or other video programming that may be of interest in ways that are not possible using conventional electronic programming guides.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for providing interactive access to video programming and video content information. Conventional electronic programming guides provide up to two weeks of video programming information. In the present invention, aggregated video content information is provided for some or all of the video programs listed in the electronic programming guide. Interactive access is provided at a multimedia system by receiving, at a processing device, aggregated video content information for video programming that is scheduled to be broadcast. The processing device of the multimedia system receives the aggregated video content information and displays the video content information to a viewer by means of an interface image. The interface image and the associated video content information are accessible by the viewer before, during, and/or after the broadcast of the video program. Additionally, the interface allows the viewer to search video content for both individual programs and multiple programs. This provides a method of gathering information about particular programs. Also provided is a manner of locating video programs by enabling the viewer to search the vast amount of video program content information provided.

Although the present invention can be practiced with substantially any type of video programming and video content information, the invention will be described below primary in the context of movies and associated movie information. The principles of the invention described below are applicable to other types of video programming such as movies, network television series, sporting event broadcasts, news programs, and a variety of other video programming and associated video content information.

As used herein, the term "video programming" extends to the audio and video data broadcast to, received by, or processed by the set-top boxes and other multimedia systems of the invention. For instance, "video programming" can be a television data or streaming video data. The term "video program" represents a specific instance of the content of the video programming. Examples of "video programs" include a specific television program, a movie, an episode of a television series, etc. The term "video content information" extends to information that relates to or describes the content of a video program.

I. User Interfaces and Video Content Information

Figure 1:
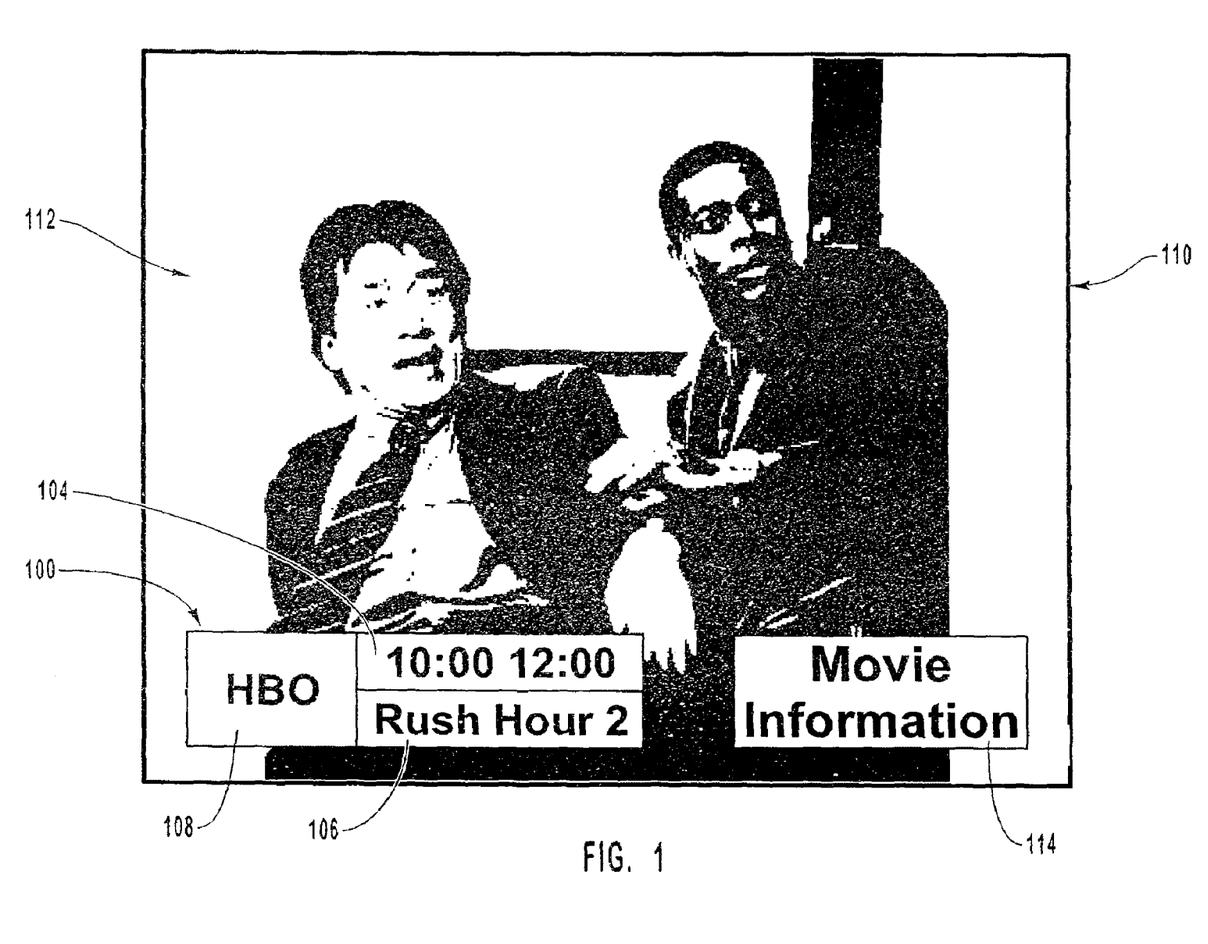
FIG. 1 depicts a display device on which a displayed video program, an information display, and a video information select icon are shown.

FIG. 1 illustrates display device 110 in which video programs and interface images of the present invention are displayed. In the illustrated embodiment, a video program is currently being displayed. Also shown in FIG. 1 is a program information display 100. Program information display 100 exhibits electronic programming guide (EPG) information related to the displayed video program. Program information display 100 includes a time element 104, a title element 106, and a channel element 108. Time element 104 illustrates the program time during which the currently displayed video program is being shown. Title element 106 indicates the title of the video program currently being displayed. Channel element 108 indicates the channel on which the currently displayed video program is being transmitted.

FIG. 1 also illustrates a video information select icon 114, which allows the viewer to access a video interface and associated video content information relating to the presently displayed video program. As will be understood by those skilled in the art, video information select icon 114 can be embodied in a variety of configurations that allow the viewer to access the interface image and the associated video content related information.

Figure 2:
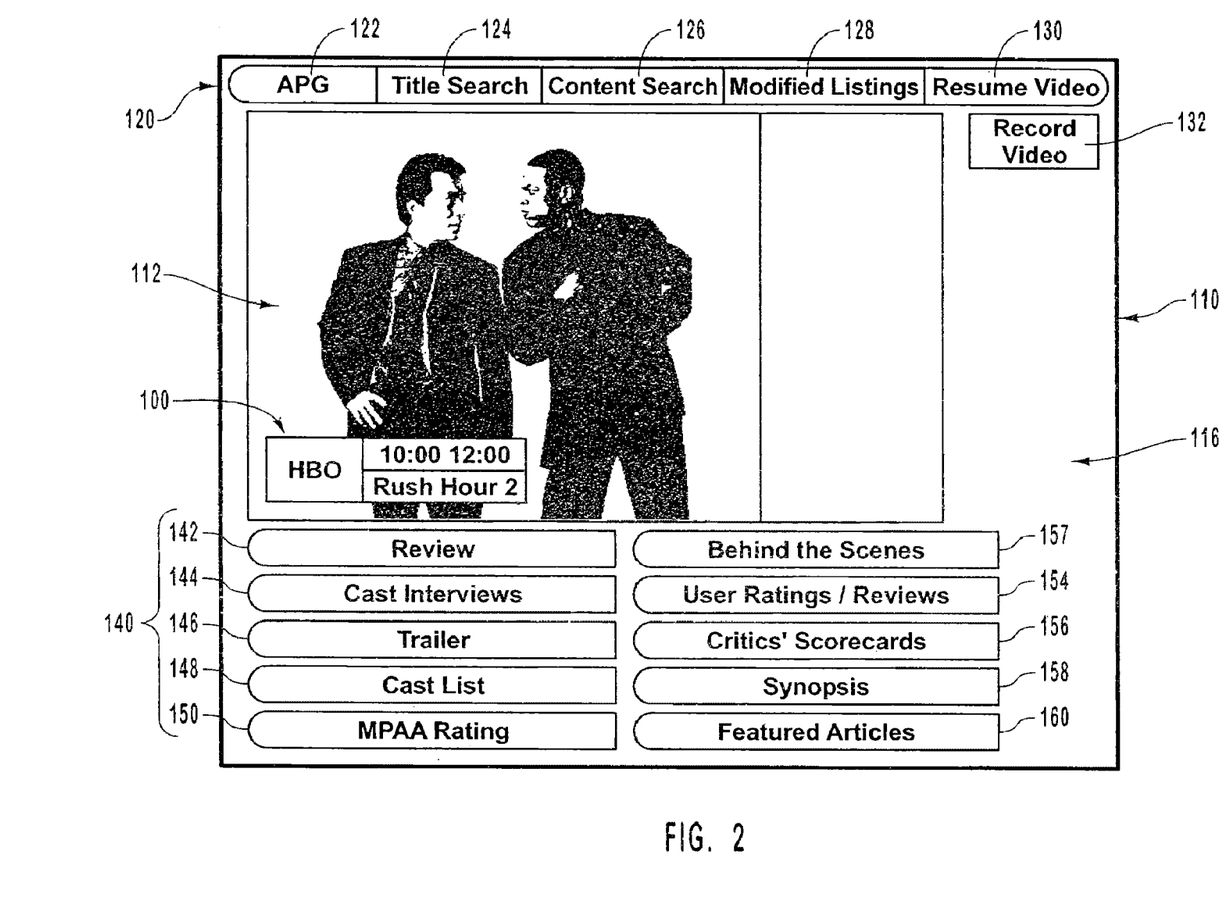
FIG. 2 shows an embodiment of an interface image illustrating video content information and displaying a video program.

With reference now to FIG. 2, there is shown an interface image 116, which provides user access to video content information. Interface image can be accessed in a variety of ways, such as through the video information select icon 114 of FIG. 1 or through an interactive EPG listing. FIG. 2 illustrates one example of a layout and content of interface image 116. The interface image 116 of FIG. 2 is a primary page of information associated with the movie that is illustrated in FIG. 1. Interface image 116 is navigable in the sense that the viewer can select from menu selections, described in greater detail below, to obtain detailed supplemental information related to the movie conveniently, to control the operation of the multimedia system with respect to the movie, and to obtain interface images associated with other movies.

Thus, interface image 116 represents a linked portal to any amount of information associated with the corresponding movie. The level of detail and the variety of information that is linked to interface image 116 depends primarily on the administrator or designer of the system and the amount of information relating to the movie that is available to the administrator or designer. The interface image 116 permits viewers to initiate a process of learning about the movie and selecting from a variety of other information associated with the movie, which can involve navigating from interface image 116 to any number of other pages or images provided by the user interface. Interface image 116 may also be used for commerce-related functionality, such as upselling pay-per-view programs or merchandise related to video content provided in interface image 116. In contrast, conventional electronic program guides typically present movie information that merely includes a summary of the movie and a small amount of related information in a non-linked and non-navigable interface.

The multimedia systems of the invention correlate video content information with the associated video programs by means of video identification information. The video identification information can be a title of the video program, a unique numerical identifier, or other such information that enables the multimedia system to identify video content information that is associated with particular video programs.

Interface image 116 includes a supplemental content menu 140 and a menu bar 120. In the embodiment illustrated in FIG. 2, interface image 116 includes a picture-in-picture window 112 in which the movie is displayed.

Menu bar 120 includes elements that present operation information to the viewer, by which the viewer can cause the multimedia system to perform selected operations with respect to the video program. These operations include, but are not limited to, searching, tuning, and recording. Menu bar 120 includes an electronic programming guide icon 122, a title search icon 124, a content search icon 126, a modified listing icon 128, and a resume icon 130. Electronic programming guide icon 122 provides the viewer with a link to the electronic programming guide, which may be a grid of video programs.

Title search icon 124 allows the viewer to search for video programs according to the title of the video programs. In the present embodiment, title search icon 124 provides a link to search functionality allowing viewers to search for movie titles. The search functionality to which title search icon 124 is linked can be configured in a number of ways. Search functionality can include key words searches, Boolean searches or other searches familiar to those skilled in the art. Reference to additional search functionality of the present invention will discussed below.

Content search 126 is a link to video content search functionality that allows a viewer to locate desired video programming utilizing data contained in the video content information. Examples of video content search criteria parseable by the video content information search include, but are not limited to, actor information, director information, genre information (e.g. comedy or action), or ratings or critic scorecard criteria.

Modified listing icon 128 allows viewers to create modified video program listings based on user-selected program criteria. Using resume video icon 130, the viewer can request display of a video program that is no longer currently being displayed on display device 110. For example, the viewer could return to a video program that was paused by the viewer to view video content information. Also shown is record video button 132, by which the viewer can record a video program that is currently being displayed on display device or about to be displayed. Recording functionality is particularly useful when a viewer decides to access video content information on an interface where the video program 112 is not being displayed.

Also shown in FIG. 2 is the supplemental content menu 140. Supplemental content menu 140 illustrates one embodiment of a way in which a viewer is able to access supplemental content information not available on the interface image 116. The supplemental content information generally is more detailed information associated with a specified category of the video content information. Buttons 142-160 represent possible categories of supplemental video content information accessible by the viewer. Movie reviews button 142 provides access to movie reviews. Celebrity interviews button 144 provides access to video interviews of celebrities appearing in a particular video program. Trailers button 146 provides viewers with access to video trailers. Video trailers allow viewers to preview video programs that are scheduled to be broadcast. Video trailers also can provide an overview of video programs that the viewer is currently viewing, but is unsure whether to finish.

Also contained in supplemental content menu 140 is cast list button 148. Cast list button 148 is a link to a cast list of actors and actresses appearing in a video program. This allows viewers to access cast lists at times other than the credits at the end of the video program. MPAA Ratings button 150 is a link to rating information for video programs. This functionality allows viewers to quickly identify programs that meet desired criteria, such as programs appropriate for children.

Behind the scenes button 152 is a link to behind-the-scenes details involved in making a particular video program. Behind-the-scenes supplemental information may include video segments and/or written articles. User reviews button 154 is a link to video program reviews written by other viewers. Critics' scorecard button 156 is a link to a comparative snapshot of professional critic ratings of video programming to assist users to select video programming based on the critical acclaim of the video programming.

Synopsis button 158 of supplemental content menu 140 is a link to the synopsis of individual video programs. Synopses provide the story line of video programs that are to be broadcast or that are currently being watched by viewers. Feature articles button 160 provides links to feature articles regarding video programs. Feature articles are useful in assisting viewers in investigating programs based on what has been written about the video programs.

Thus, FIG. 2 illustrates an interface image 116 that is related to a movie that is currently being broadcast, has just finished being broadcast, or that will be broadcast in the future. As explained above, interface image 116 includes elements, such as those of menu bar 120, by which the viewer can control the functionality of the multimedia system with respect to the movie, and includes other elements, such as those of supplemental content menu 140, by which the viewer can obtain further information relating to the movie. In this manner, interface image 116 represents a unified portal or central point of access for system operation and video content information associated with a particular movie. The icons of menu bar 120 and buttons of supplemental content menu 140 are merely illustrative and may be embodied in a variety of configurations and populated with a variety of video content information or supplemental content information.

Figure 3:
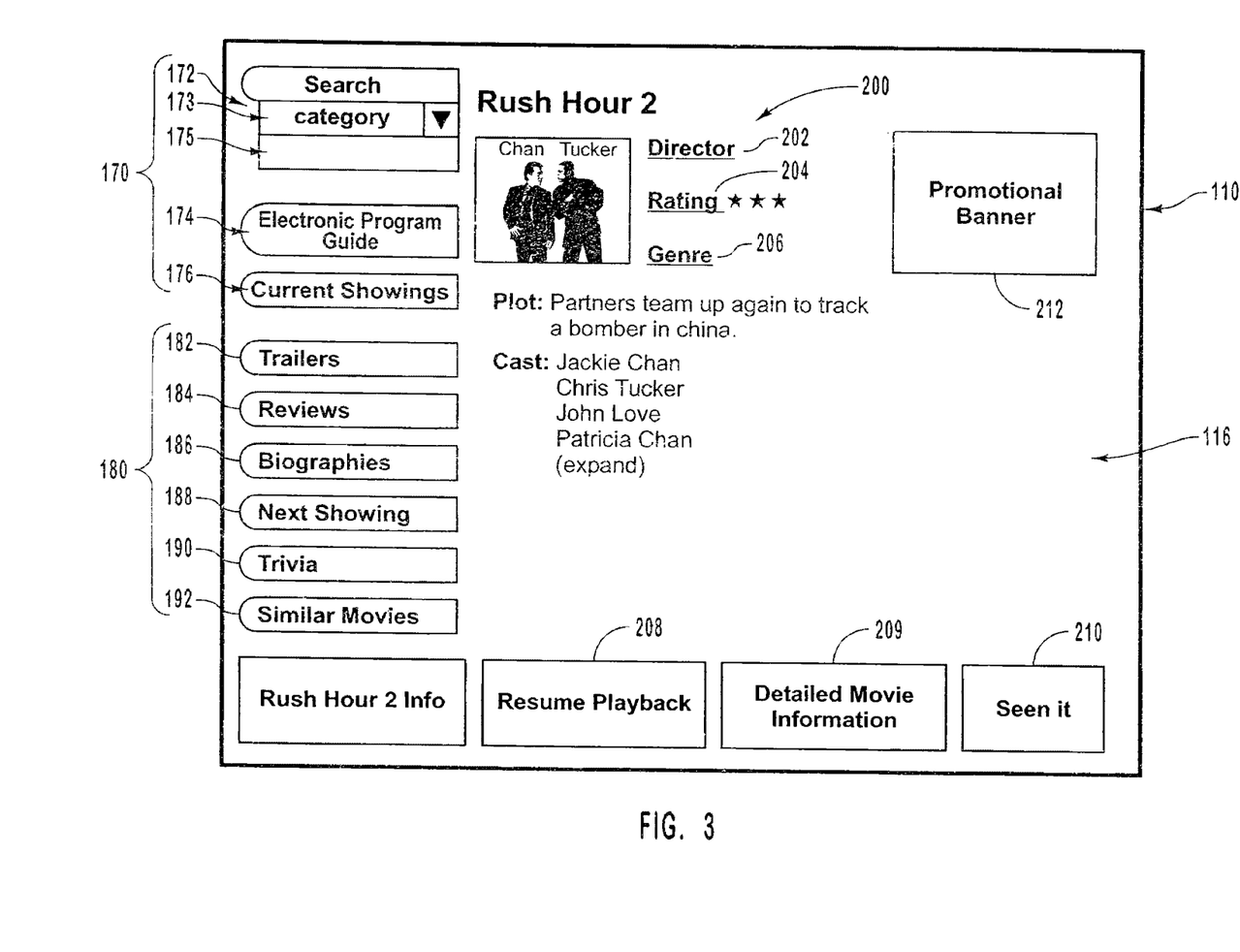
FIG. 3 illustrates an alternative embodiment of interface image illustrating video content information, a video search menu, a supplemental content menu; and a "Seen It" feature.

FIG. 3 illustrates another embodiment of interface image 116, which also is related to a movie and presents options for controlling the system with respect to the movie and for accessing supplemental video content information in a navigable and linked manner. In the illustrated embodiment, interface image 116 comprises a video search menu 170, supplemental content menu 180, and video content information 200. In the present embodiment, video content information 200 is presented when the interface image 116 is first accessed. The video content information is organized such that a viewer may navigate summaries of the video content information 200 quickly and efficiently.

In the present embodiment, video content information comprises information such as director information 202, rating information 204, and genre information 206. Video content information provides viewers with a wealth of information related to video programming. By providing access to video content information on the same system on which the viewer access and view the video programming, the viewer obtains an enhanced viewing experience.

In a preferred embodiment, video content information 200 also allows access to supplemental content information. As used herein, "supplemental content information" is one type of video content information and includes detail not present on the primary interface image associated with a particular video program. For example, director information 202 is a link to supplemental content information regarding the director of the selected video program. Supplemental content information also can be configured to assist the viewer in identifying additional video programs of interest as will be explained below in reference to FIG. 4.

Video search menu 170 provides a way in which a viewer may identify other video programs that may be of interest. In the illustrated embodiment, video search menu 170 comprises a search module 172, an electronic programming guide icon 174, and a current showings icon 176. Search module 172 allows viewers to formulate custom searches to identify video programs of interest. Electronic programming guide icon 174 provides a link to an electronic programming guide. By providing a link to the electronic programming guide, viewers are able to browse the electronic programming guide directly. Current showings icon 176, in one embodiment, provides a link to a listing of video programs currently being broadcast. In an alternative embodiment, current showings icon 176 is a link to listings of video programs to be shown in a particular time frame that viewers identify as being current.

In alternative embodiments, the current showings icon 176 is linked to listings that are filterable and/or customizable by viewers.

Returning to a discussion of search module 172, in the illustrated embodiment search module 172 comprises a search criteria window 175 and a keyword selector button 173. Keyword selector button 173 allows the viewer to select from a list of keywords to identify video programs of interest. By selecting one or more of the identified keywords, the viewer obtains a listing of video programs associated with the identified keywords. Search criteria window 175 allows a viewer to input custom search criteria, such as actor names, titles of movies and genre of films, to identify video programs of interest. In the preferred embodiment, search criteria window 175 allows viewer to select from one to many search criteria.

In one embodiment, search module 172 allows searches to be conducted utilizing both keywords and custom search criteria. For example, the viewer can search by selecting a keyword from the keyword selector button 173 (e.g., the "comedy" keyword) and by inputting customized criteria into search criteria window 175 (e.g., actor and release year). The exemplary search results include all video programs for which aggregated content data is associated with a current program listings, and which are comedies, contain the identified actors, and were released in the defined release year.

Also included on interface image 116 of the illustrated embodiment is a supplemental content menu 180. Supplemental content menu 180 illustrates another example of a way in which viewers can access supplemental content not available on the interface image 116 (see also menu 140 of FIG. 2). Supplemental content menu 180 includes a trailer selector button 182, a reviews selector button 184, a biography selector button 186, a next showing button 188, a trivia selector button 190, and a similar movies selector button 192. Buttons 182-192 represent a way by which a viewer can access supplemental content, through the interface image 116.

In the illustrated embodiment, interface image 116 also includes a resume video button 208. Resume video button 208 permits viewers to resume playback of video program previously being viewed. In the illustrated embodiment, interface image 116 also includes a supplemental content selector button 209. Supplemental content selector button 209 permits viewers to request detailed video content information and/or supplemental content information not available on the interface image 116.

In the illustrated embodiment, interface image 116 also includes a "seen it" button 210, by which viewers indicate that a particular video program has been previously viewed. Seen it button 210 may be included in other places within the system, including the interface image 116 and/or the electronic programming guide. This allows the viewer to skip programs previously viewed, thus narrowing the quantity of video programs the viewer must browse. "Seen it" may also allow viewers to decide whether or not previously viewed programs should be indicated. Thus, by selecting "seen it" button, the system will display a "seen it" icon next to all listing previously viewed. In the illustrated embodiment, interface image 116 also includes promotional content 212, which can include advertising information, product point-of-purchase information, and/or a link to affiliated commerce websites. As will be understood by those skilled in the art, promotional content 212 may comprise advertising space. The advertising space may comprise banners or paid for interactive links to one or more websites. The advertising space may be used as a means of generating revenue or promoting ones own product and/or services.

Figure 4:
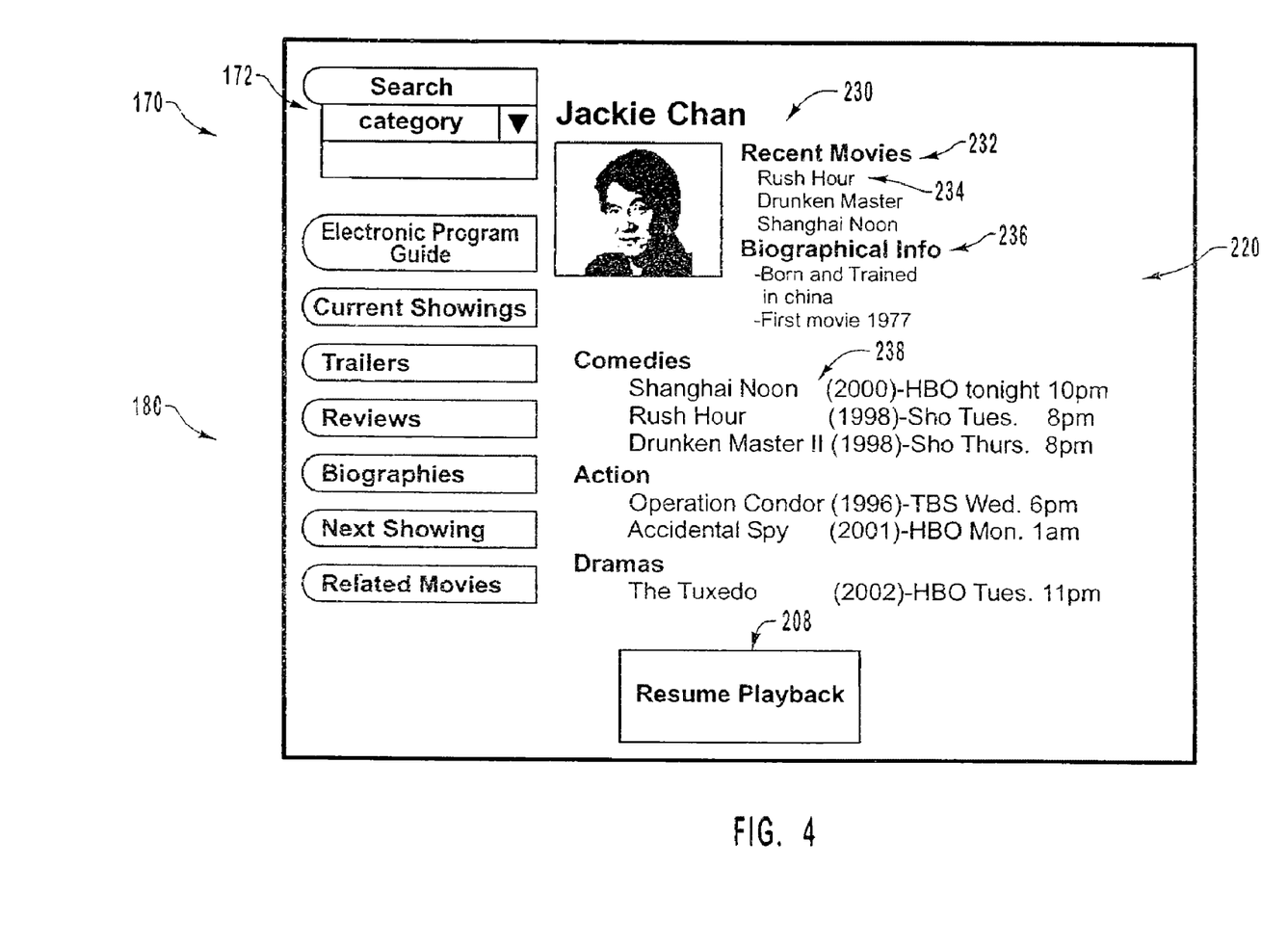
FIG. 4 illustrates a supplemental content interface of the present invention, wherein the supplemental content information comprises actor information.

With reference now to FIG. 4, there is illustrated a supplemental content interface 220 in which supplemental content information is provided to viewers. Supplemental content interface 220 provides a method for allowing access to content information not provided on interface image 116 illustrated in FIGS. 2 and 3. Supplemental content information provided on supplemental content interface 220 can also allow access to information related to, but also being in addition to, information disclosed on interface image 116. For example, supplemental content illustrated in FIG. 4 is supplemental actor information related to an actor listed on interface image 116 of FIG. 3 as appearing in a given video program.

The viewer can select a supplemental content interface by selecting the actor name on interface image 116. The actor name on interface 116 is provided with an interactive link allowing viewers to access supplemental information related to the actor. The interlinked nature of the video content information and supplemental content information allows the viewer to access supplemental content information relating to a variety of different types of information.

Content associated with interactive links interface image 116 is not the only way of accessing supplemental content. In one embodiment of the present invention, supplemental content interface 220 is accessed through select buttons as illustrated in FIG. 2 (142-160) and FIG. 3 (182-190, and 209). In an alternative embodiment, supplemental content interface 220 can be accessed through interactive video content information, such as that displayed in FIG. 3 (202-206). Supplemental interface 220 and the associated content information can be configured to be accessible from a variety of locations within the system. The high degree of accessibility is a result of the highly interactive and cross-linked nature of the present system. Supplemental content interface 220 includes supplemental content information 230, video search menu 170, and supplemental content menu 180. In this embodiment, supplemental content information 230 comprises supplemental actor information (i.e. of an actor who appeared in the video program of the previously accessed interface image 116). While the supplemental content information 230 of the illustrated embodiment comprises supplemental actor information, supplemental content information 230 can also comprise in-depth information on other topics including movie reviews, trivia, awards information or any other topic for which video content information is available.

In the illustrated embodiment, supplemental actor information comprises recent movies information 232, biographical information 236 and actor/actress videos listing 238. Recent movies information 232 provides a list of video program titles in which the actor has recently appeared. Movies titles shown in the recent movies information 232 include an interactive link to other videos 234 in the video programming. By selecting the interactive link to the other videos, the viewer can access the interface image for the other video program or the other video program itself and find out if the program is represented in broadcast listings now in the future.

Biographical information 236 presents interesting biographical information about the actor. Biographical information makes browsing supplemental content information amusing and informative. Actor/actress videos listing 238 lists videos in which the actor or actress has starred or appeared and is otherwise known as a filmography of the actor or actress. In the currently illustrated embodiment, the actor's videos are listed according to their genre. However such actor/actress video listings 238 may be presented to viewers in a variety of configurations such as according to release date, MPAA rating, etc.

In the currently illustrated embodiment, supplemental content interface 220 also contains video search menu 170 and supplemental content menu 180. By including menus 170 and 180 the viewer is able to search for additional video programs of interest as well as browse additional video content information and supplemental content information for the video program currently being researched. Supplemental content interface 220 also includes a resume video button 208 through which a viewer may resume playback of a video program previously being viewed.

Figure 5:
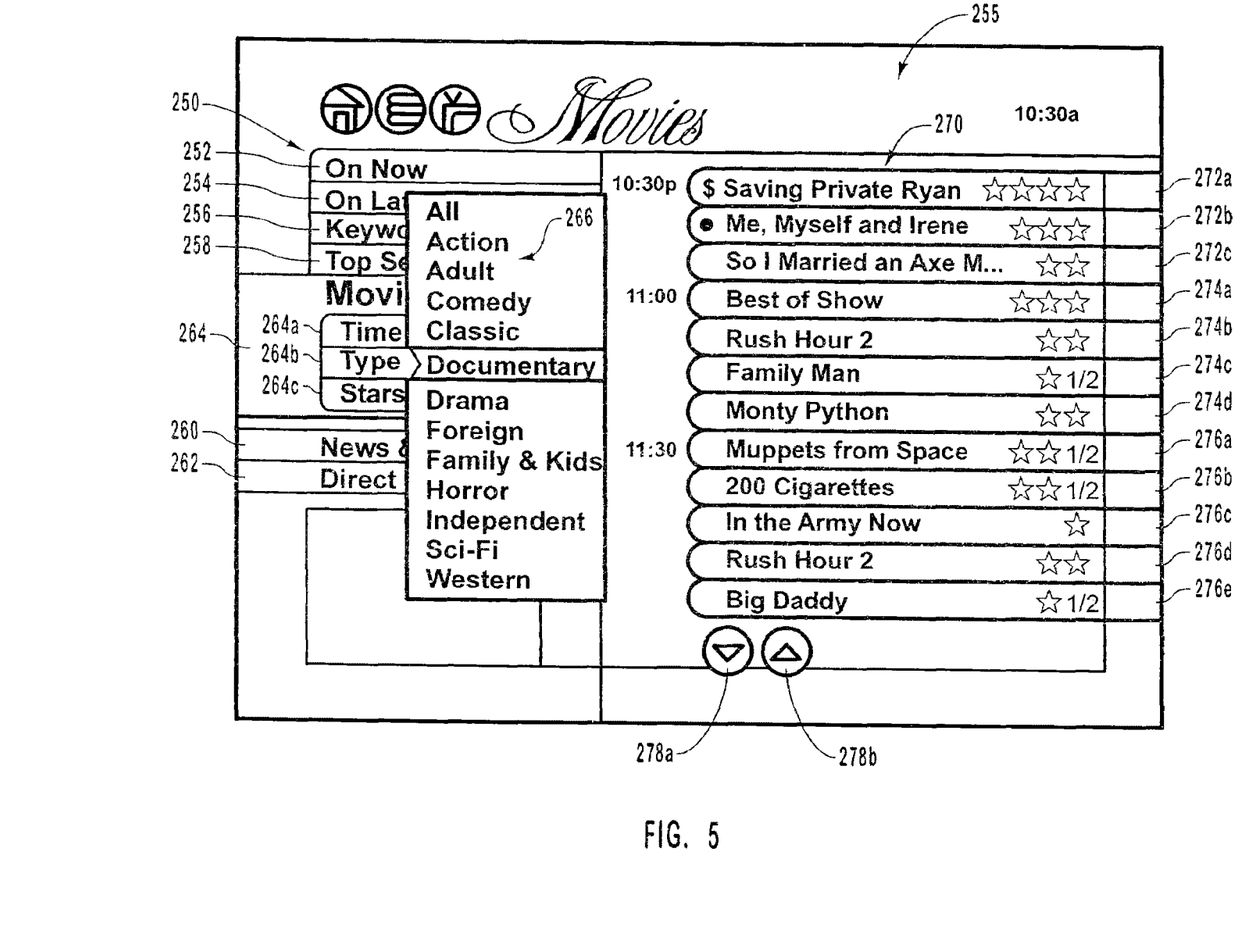
FIG. 5 illustrates a filtered video program listing of the present invention, a video search module, and a narrow it down menu with the corresponding filter buttons.

With reference now to FIG. 5, there is shown a search results interface 255. Search results interface 255 displays the results of an initial video program search conducted by viewers. The searching functionality associated with search results interface 255 represents a useful and valuable component of interactivity associated with the present invention. By allowing viewers to search video content information, viewers are able to conduct a variety of searches of varying levels of complexity and precision.

In the illustrated embodiment, search results interface 255 includes a filterable video program listing 270 and a narrow it down menu 264. Menu items 250-258, 260 and 262 represent other possible features in a video program service. Video program listing 270 displays the search results of searches that were previously conducted. Narrow it down menu 264 allows viewers to refine and reduce the number of video program listings from a larger list of video program listings. Examples of how filtering functionality related to filterable video program listing 270 and narrow it down menu 264 can identify video programs to be shown to viewer include, but are not limited to: (i) filtering based on search criteria selected by the viewer through use of an icon or selector button; and (ii) filtering based on search criteria selected through the search module 172.

In the illustrated embodiment, a list of video programs was previously shown to the viewer. Filterable video program listing 270 and narrow it down menu 264 allowed the viewer to apply a filter to the video programs to narrow the type of video programs listed. In FIG. 5, the results of the system filtering are displayed. The filtered video program listings 270 are video programs that were selected according to initial, broad search criteria. (e.g., "all movies on now; current time being 10:32.) The viewer can select additional criteria to further filter the video program listings 270. For example, the viewer can select all movie video programs classified as documentaries that are shown during the time slot beginning after 10:30 p.m. The viewer then could select four-star documentaries only, with MPAA ratings of PG-13 and below, and/or years 1990-2000 to further refine the search. When the viewer selects additional criteria to be applied to the video program listing, the subsequently displayed list changes on-screen while criteria are selected. For example, the resulting filterable video program listing 270 will show only those movies to be shown that are documentaries with starting times of 10:30 p.m. or later. However, the user can interactively select drama while at documentaries are shown. In response thereto, the screen automatically alters the listings to show all movies that are dramas with starting times of 10:30 p.m. or later. Video program listing 270 may represent results of any of a variety of search criteria. Such search criteria may be input or selected by viewers. For example, search results also might include video programs shown during a given program time slot, those of a given type (e.g. action, comedy, drama), and/or those featuring given stars (i.e. actors or actresses).

In the present embodiment, filterable video program listing 270 comprises video listings starting at 10:30 p.m. 272a-c, video program listings starting at 11:00 p.m. 274a-d, and video program listings starting at 11:30 276a-e. Scrolling buttons 278a, b allow the user to scroll to movies starting at other times. This is but one embodiment of the filtered video program listing. Filterable video program listing 270 can be arranged in a variety of configurations to provide optimal navigability for the search results.

Narrow it down menu 264 of search results interface 255 allows the viewer to quickly and efficiently reduce the number of listings in the filterable video program listing 270. The menu 250, the associated selector window 264, and the interactive filter criteria window allow the users to filter through the filtered video program listing 270 to identify video programs of interest. Since the listings are automatically updated based on user selections, users of all levels of sophistication may quickly view the results of the system filtering without confusion.

In one embodiment of the present invention, the system is also configured to allow viewers to input commands with respect to identified video programs. Examples of such input may include a record request or a program reminder request. By inputting a record request, the viewer can record an identified video program. In one embodiment, the video program is recorded on a hard disk of a digital video recorder or on another recording medium. In another embodiment, the video program is recorded in storage device. In yet another embodiment, once the video program is recorded, it is held in storage device for a predetermined period before being erased from system memory. The video program reminder represents an audible, visual or electronic reminder to a viewer that a particular video program is to be broadcast.

In one embodiment of the present invention, viewers can access interface images from a variety of places within the system. For example, the viewer can access the interface image 116 from an interactive filtered video program listing. Such interactivity can be provided through a video information select module, such as an icon or an interactive link provided in the text of the listing.

II. Network Architecture and Functionality

Figure 6:
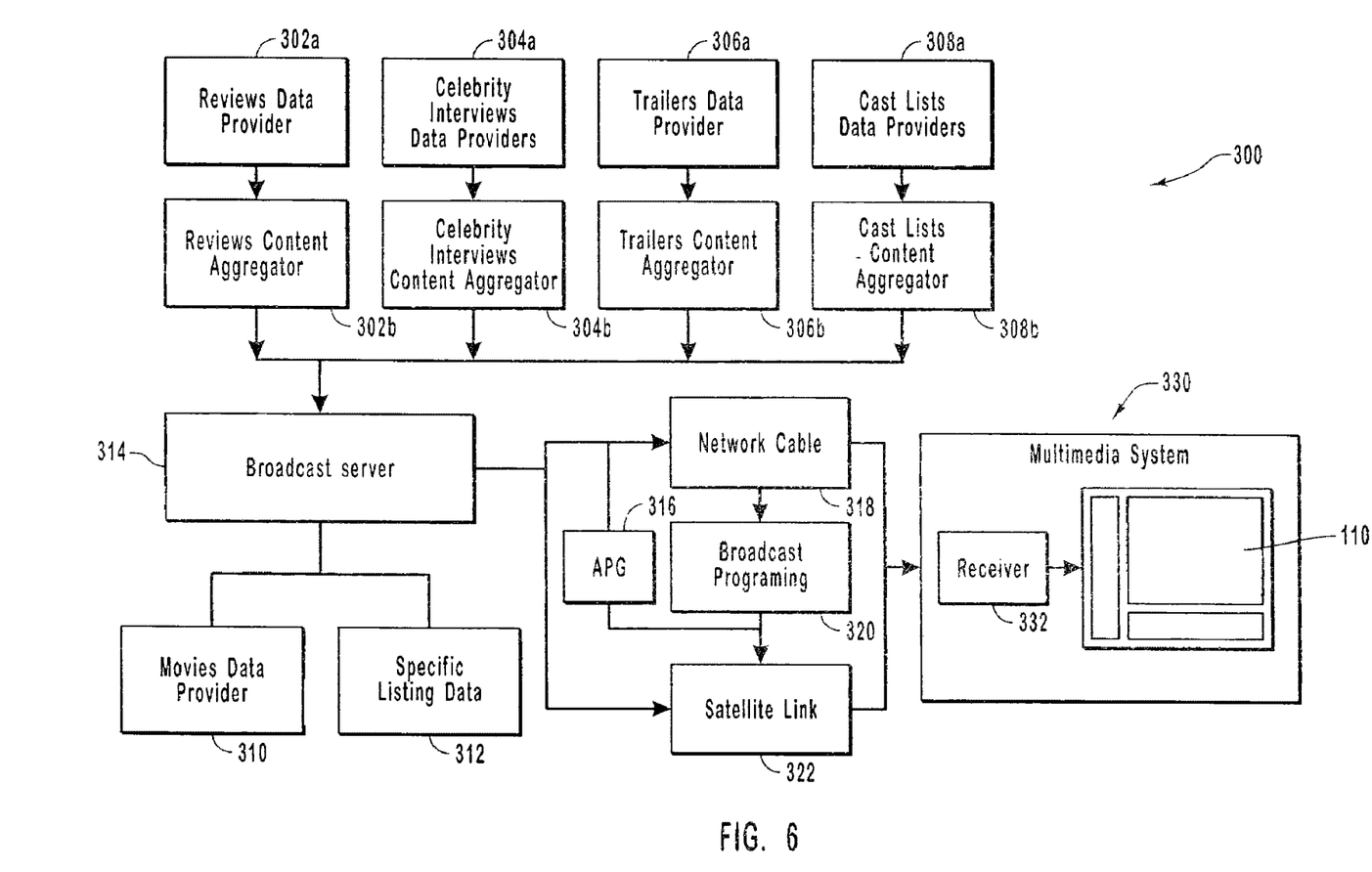
FIG. 6 is a block diagram illustrating a video content aggregation system representing the manner in which video content information is aggregated, associated with video programming and sent to a multimedia system.

With reference now to FIG. 6, there is shown a video content aggregation system 300. Video content aggregation system 300 compiles and prepares video content information and supplemental content information associated with video programs to be broadcast to a multimedia system. While video content aggregation system 300 is described with reference to the present invention, a variety of distribution systems may be employed with the present invention such as that disclosed in U.S. application Ser. No. 09/904,409, filed Jul. 12, 2001, entitled "System for Creating and Delivering Enhanced Television Services," which is incorporated herein in its entirety by reference.

In the illustrated embodiment, data providers, such as reviews data providers 302a, celebrity interviews data providers 304a, trailer data providers 306a, and cast data providers 308a, accumulate data representing discrete types of video content information utilized by the system. Content aggregators, such as reviews content aggregator 302b, celebrity interviews content aggregator 304b, trailers content aggregator 306b, and cast lists content aggregator 308b, aggregate the desired portions of the discrete types of video content information from the data providers. The aggregated data is then sent to a broadcast server 314.

In receiving video content data, broadcast server 314 also receives movies data and specific listing data from movies data provider 310 and specific listings data provider 312. Thus broadcast server 314 is able to broadcast a video program with its associated video content information. All listing data is aggregated and prepared to be sent to multimedia system 330. Content information is associated with the video programming through the use of a unique video program identifier. The video programming and the associated content information are then transmitted to multimedia system through network cable 318, broadcast programming 320, satellite link 322, or any other communications medium that can be used to transmit video programming and video content information. Thus, the interface images on which the video content information is displayed can originate from a variety of sources. The interface images can be constructed by the client multimedia system based on the video content information. Alternatively, the formatting of the interface images can be selected by the broadcast server or the source of the video content information. In the latter alternative, the interface images can be web pages obtained from web servers.

Multimedia system 330 comprises a receiver and a display device 110. The receiver accepts an incoming transport stream. The transport stream is processed to access video programs and associated video content information. After appropriate processing, video programming and associated video content information may be displayed on display device 110.

Figure 7:
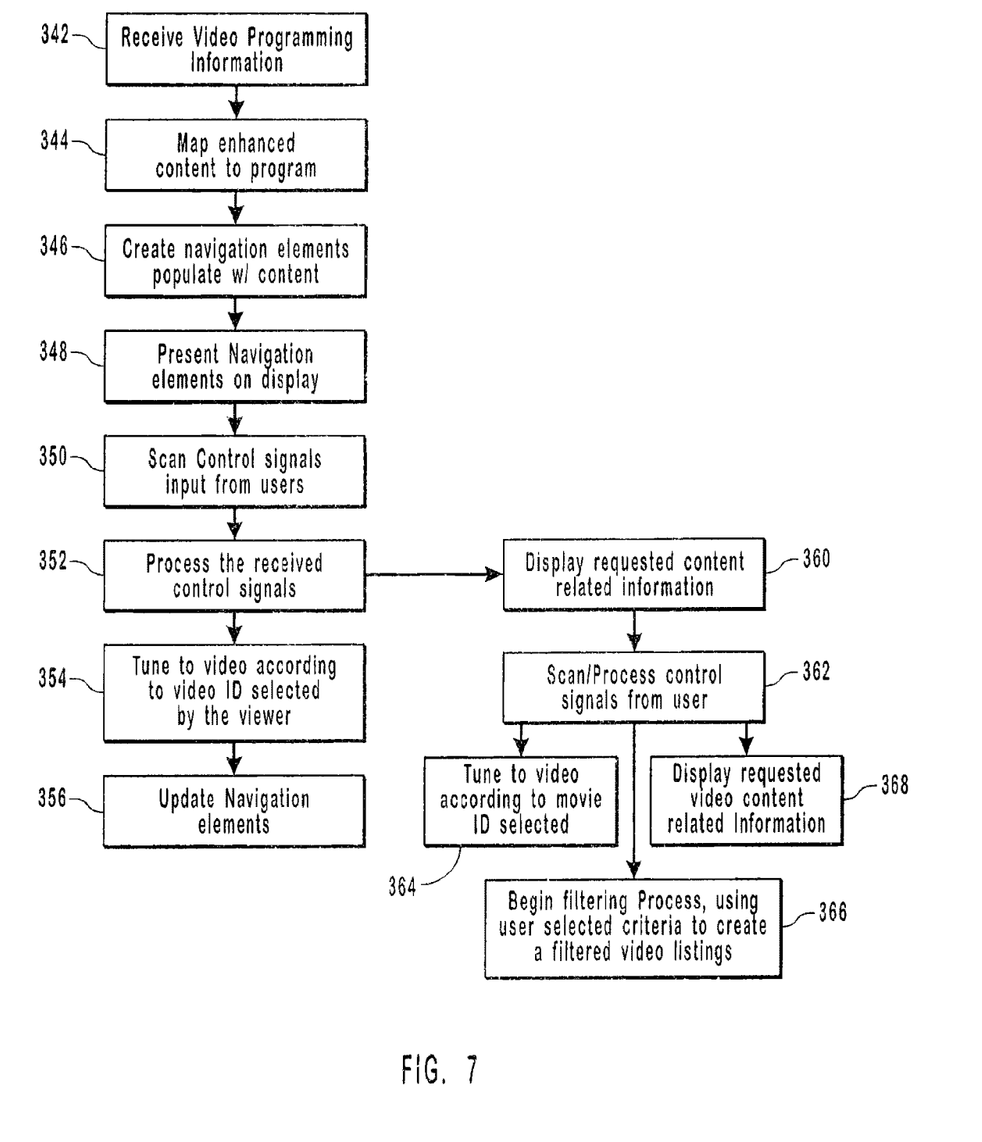
FIG. 7 is a flow chart representing steps for providing interactive access to video programming and video content information in a multimedia system.

With reference now to FIG. 7, there is shown a flow diagram representing an embodiment of a method by which video content information may be interactively presented to a viewer of the multimedia system 330. In the illustrated method, a step of receiving video programming information 342 is conducted. Upon receiving video programming information 342, the step of mapping enhanced content to a video program 344 is executed. Once the step of mapping enhanced content to a video program has been completed, the step of creating navigation elements and populating new navigation elements with content 346 is conducted. The step of presenting navigation elements on the display device 348 is then conducted. Once the navigation elements have been presented on the display, the step of scanning the control signal input from viewers is executed. Once the control signals are input from the viewers, the step of processing the received control signals is conducted. Depending on the nature of the control signals input by viewer, one of the steps, as represented by boxes 352 and 354, is conducted. Where the control signals indicate selection of video identification information of a particular video program, the step of tuning to the video program 354 is executed. Upon tuning to the selected video, the step of updating navigation elements 356 is conducted.

Returning to step 352, where the control signals received indicate selection of video content information of a particular video program, the step of displaying requested video content information 360 is executed. Upon displaying the requested content information, the steps of scanning and processing control signals from viewer 362 are conducted. Depending on the nature of the control signals input by viewer, one of the steps, represented by boxes 364, 366, and 368, is conducted. Where the control signals from viewer represent a request to display a particular video program, the step of tuning to video according to the unique identifier selected 364 is conducted. Where control signals from viewer indicate a search or narrow it down request, the step of beginning filtering process using user selected criteria to create filtered video listing 366 is executed. Where control signals from the viewer represents a request for additional video content information, the step of displaying requested video content related information 368 is executed.

As demonstrated by FIG. 7, in one embodiment of the present invention, video programming is associated with its corresponding video content information by the use of unique identifiers. Interface images, such those that include navigation elements, are then populated with the corresponding video programming information. This allows viewers to identify desired video programs, view video programs being broadcast, and browse video content related information. At any point before, during, or after, the display of live video programming, the viewer is able to access the interface image and the associated content to find a variety of information related to the video program as well as utilize searching functionality to search for additional video programs.

The embodiments of the present invention may comprise a special purpose or general purpose computer including various computer hardware, as discussed in greater detail below. Set-top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention is described herein in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 8:
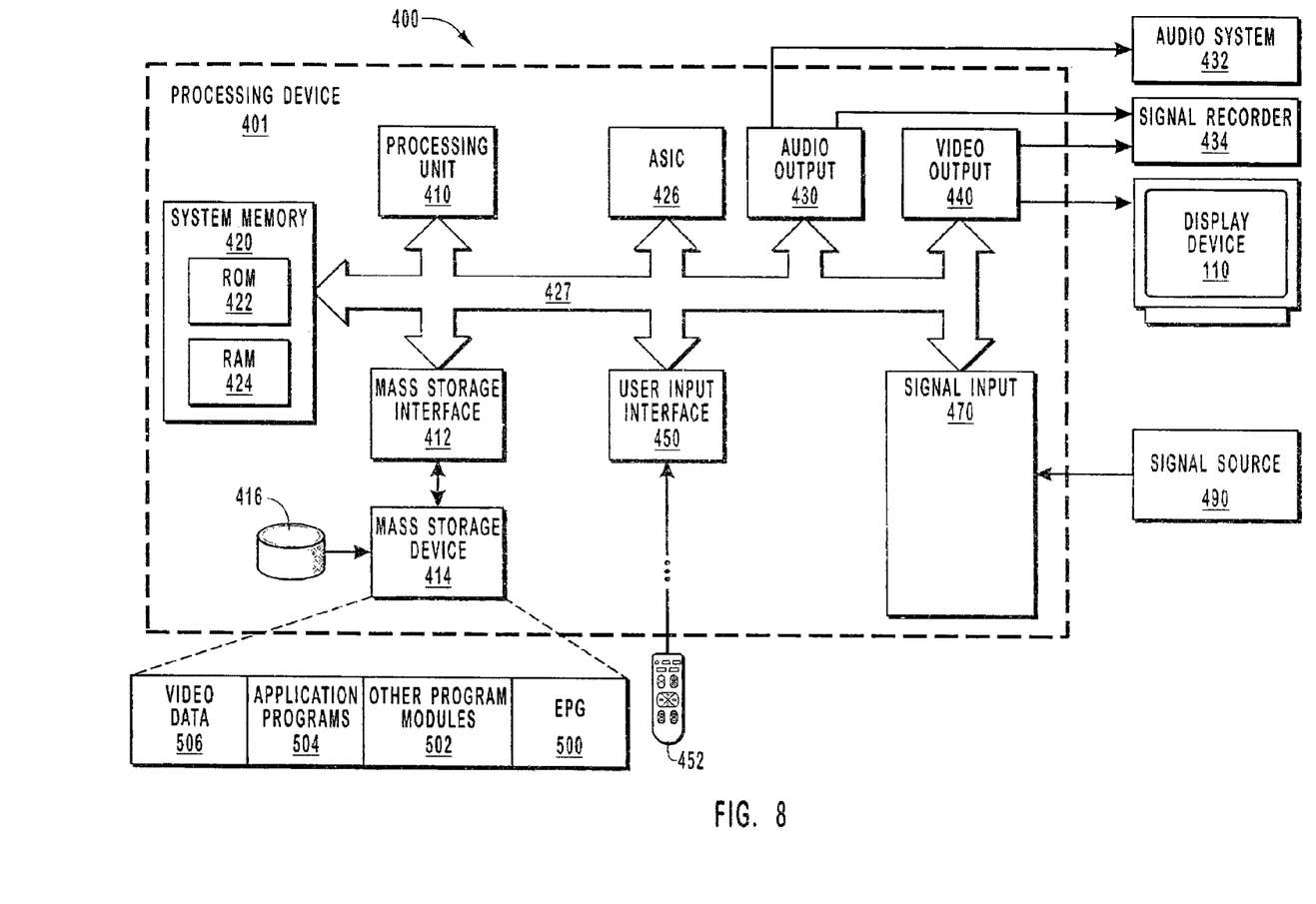
FIG. 8 illustrates an exemplary system that provides a suitable operating environment for the present invention.

FIG. 8 and the corresponding discussion are intended to provide a general description of a suitable client environment in which the invention may be implemented. In the discussion, reference is made to a processing system that may be used for displaying and/or recording programming. For purposes of this description and in the claims, a "processing system" may be a display unit, such as a television screen, coupled to a processing device for performing the data processing steps disclosed herein, or may include any number of interconnected consumer electronic devices, one of which having a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein.

FIG. 8 illustrates a multimedia system 400 that includes a processing device 401, a display device 110 and an audio system 432. Processing device 401 may be a set-top box or Internet terminal that has been adapted to perform the operations disclosed herein. Processing device 401 may be integrally positioned with or separate from display device 110. Processing device 401 includes a signal input 470, which receives video programming from a signal source 490.

Processing device 401 also includes a user input interface 450, which receives input from an input device 452, such as a remote control, keyboard, microphone, or any other device capable of generating electronic instructions for processing device 401.

FIG. 8 illustrates a signal recorder 434, which is capable of receiving video and/or audio data and recording the data on a storage medium. Video signals are transmitted from video output 440 to signal recorder 434 and/or display device 110 by a video image link, examples of which include a radio-frequency ("RF") link, an S-video link, a composite link, or any other equivalent form of video image link. Similarly, an audio link transmits audio data from audio output 430 to audio system 432 or to signal recorder 434.

The operation of management system 401 is controlled by a central processing unit ("CPU"), illustrated as processing unit 410, which is coupled to an application-specific integrated circuit ("ASIC") 426 and uses computer-executable instructions implemented in software and/or hardwired logic circuitry. Processing unit 410 and ASIC 426 are coupled via a system bus 427, which also interconnects various other system components, such as the system memory 420, mass storage interface 412, user input interface 450 and signal input 470. Processing unit 410 executes software designed to implement features of management system 401 including features of the present invention. ASIC 426 contains circuitry that is used to implement certain functions of management system 401. Instructions, data, and other software necessary for the operation of processing unit 410 and ASIC 426 may be stored in the system memory 420, such as in read-only memory ("ROM") 422 and/or in random-access memory ("RAM") 424, and/or in a mass storage device 414, which is coupled to mass storage interface 412. ROM 422, RAM 424 and mass storage device 414 are communicatively coupled to ASIC 426 so as to be readable by ASIC 426 and so that data may be written from ASIC 426 to RAM 424 and possibly mass storage device 414.

Mass storage device 414 may be a magnetic hard disk 416 or any other magnetic or optical mass memory device that is capable of storing large amounts of data. Any desired computer-readable instructions or data, including application programs 504, other program modules 502, and the electronic programming guide 500 with the associated video content information, interface images, and supplemental information of the invention. Mass storage device 414 can also be used to record video data 506, in which case, management system 401 generates as a digital video recorder.

While FIG. 8 and the corresponding discussion above provide a general description of a suitable environment in which the invention may be implemented, it will be appreciated that the features of the present invention disclosed herein may be practiced in association with a variety of different system configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a multimedia system that includes a processing device for receiving and processing video programming and associated video content information and a display device for displaying the video programming and associated video content information, a method of searching the video programming using the video content information, the method comprising:

receiving primary search criteria from a viewer;

searching video programming for video programs corresponding to the primary search criteria;

displaying a search results interface including:

a video program listing, the video program listing identifying a plurality of video programs satisfying the primary search criteria, wherein each of the identified plurality of video programs includes a link to an interface image containing video content information about the respective video program; and a filter menu, the filter menu including a plurality of filters for refining the search results according to one or more secondary search criteria;

receiving viewer input selecting the link for one of the plurality of video programs in the video program listing; and accessing the interface image for the corresponding video program, the interface image for the corresponding video program including:

a video display displaying a graphical image representing the video program; and a supplemental content information menu, the supplemental content information menu including a list of various categories of supplemental content information, and each of the various categories being selectable to retrieve a corresponding content page of corresponding category.

2. A user interface usable in a multimedia system that includes a processing device for receiving and processing video programming and associated video content information and a display device for displaying the video programming and the user interface, the user interface including:

a filterable search results page, the filterable search results page including:

a search results section, the search results section having therein a listing of a plurality of video programs identified as corresponding to primary search criteria, each of the search results having a link thereon that, when selected, directs the user to a video program supplemental content page for the corresponding video program; and a filter section, the filter section including a plurality of different filters, each of the plurality of different filters being selectable by the user to identify secondary search criteria, wherein the filter section is linked such that upon selection of a filter, the selected filter is executed to narrow the listing of the plurality of video programs to identify only those that correspond to secondary search criteria corresponding to the filter;

for a video program selected using the link of the search results, a supplemental content page having:
a graphical representation of the video program;
a search menu for executing any of a plurality of different types of searches; and
a linked menu of supplemental content categories; and
a secondary supplemental content page for each supplemental content category in the linked menu, each secondary supplemental content page including:

supplemental content information corresponding to a respective category; and at least one search menu option for searching the video programming.

* * * * *

UNITED STATES PATENT AND TRADEMARK OFFICE
CERTIFICATE OF CORRECTION

| | | |
|---|---|---|
| PATENT NO. | : 8,122,472 B2 | Page 1 of 1 |
| APPLICATION NO. | : 11/873348 | |
| DATED | : February 21, 2012 | |
| INVENTOR(S) | : Krieger et al. | |

It is certified that error appears in the above-identified patent and that said Letters Patent is hereby corrected as shown below:

In column 10, line 56, after "now" insert -- or --.

Signed and Sealed this
Thirtieth Day of October, 2012

David J. Kappos
*Director of the United States Patent and Trademark Office*